United States Patent [19]

Kohar et al.

[11] Patent Number: 5,547,047
[45] Date of Patent: Aug. 20, 1996

[54] BRAKE CALIPER SHOCK AND VIBRATION ISOLATION SYSTEM

[75] Inventors: Richard Kohar, Kingston, Canada; Brian M. McLaughlin, Watertown, N.Y.

[73] Assignee: New York Air Brake Corporation, Watertown, N.Y.

[21] Appl. No.: 378,357

[22] Filed: Jan. 25, 1995

[51] Int. Cl.⁶ .................................................. B61H 13/00
[52] U.S. Cl. .................................... 188/59; 188/205 A
[58] Field of Search ........................... 188/58, 59, 73.35, 188/73.36, 73.37, 56, 72.9, 381, 106 R, 107, 205 R, 205 A, 206 R; 384/296, 215, 220; 403/149, 326, 120, 119

[56] References Cited

U.S. PATENT DOCUMENTS

| | | | |
|---|---|---|---|
| 2,374,859 | 5/1945 | Gaenssle | 188/59 X |
| 2,827,303 | 3/1958 | Herbenar | 384/215 X |
| 3,152,846 | 10/1964 | Dumpis . | |
| 3,193,335 | 7/1965 | Wing | 384/296 |
| 3,989,126 | 11/1976 | Katzer | 188/206 R |
| 4,053,034 | 10/1977 | Katzer | 188/206 R |
| 4,446,948 | 5/1984 | Melinat . | |
| 4,480,722 | 11/1984 | Wirth | 188/59 |
| 4,766,980 | 8/1988 | Engle | 188/206 R |
| 5,058,712 | 10/1991 | Noah | 188/59 |

FOREIGN PATENT DOCUMENTS 2179105  2/1987  United Kingdom ................... 188/59

Primary Examiner—Douglas C. Butler
Assistant Examiner—Peter M. Poon
Attorney, Agent, or Firm—Barnes & Thornburg

[57] ABSTRACT

A system includes rigid non-metal washers separating a caliper lever from the bridge, a rigid non-metal bridge bushing separating a shaft of a bridge pin from the bridge and a rigid non-metal lever bushing separating the bridge pin from the lever. The bridge bushing and lever bushing absorb shock and transmit forces between the bridge pin, bridge and lever during the initial phase of the actuation of the brake caliper assembly. A non-metal spring is provided between the bridge pin and the lever to retard vibration of the bridge pin relative to the lever when the brake caliper assembly is not activated. The spring preferably includes at least one ring between the bridge pin and the lever and is in a recess of the lever bushing. The ring is pre-loaded by the bridge pin.

17 Claims, 3 Drawing Sheets

BRAKE CALIPER SHOCK AND VIBRATION ISOLATION SYSTEM

BACKGROUND AND SUMMARY OF THE INVENTION

The present invention relates generally to brake caliper assemblies, and more specifically to a shock and vibration isolation system for brake calipers.

Since the 1960's, rail car operation and engineering have been experiencing the need for faster, safer and more light weight trains. The industry has been gaining experience in metallurgy and failure mechanisms as well as the ability to generate better definition of vibration operating environments affecting the brake systems.

The need for faster, safer trains has dictated the use of more complicated brake actuator and caliper systems. These systems usually incorporate intricate slack adjustor systems. With so many more pieces, the probability of failure due to component systems responding to a wider spectrum of damaging vibrations has become a problem.

With the advancements in vibration technology has come a better understanding of the brake component failure mechanisms. The damaging shock and vibrations can be accurately defined. To isolate these from the brake caliper and actuator, a tuneable, adjustable, isolation system is needed which will reduce the shock loading also. The present systems are not easily adjusted without an expensive and time consuming design or production modification. Many brake systems do not have any shock or vibration isolation for the calipers and actuators.

Many suspension systems address shock by isolating the calipers from the truck mounting brackets. However, even these systems do not reduce one of the major causes of brake caliper wear, fretting. Fretting is where a component is able to move or has play in it due to assembly tolerances. While the components are in the unloaded condition, namely brakes not applied, they are free to move around. In many cases, they rattle around or are responding to the ever present broad range of vibration generated by a rail car's steel wheel and stiff primary suspension systems. These never ending, continuous micro-motions are the main ingredient in fretting. Because the mating steel on steel surfaces are not heavily loaded when the brakes are not applied, moisture and oxygen can continually attack and form oxides on the mating surfaces. These continually forming oxides are then quickly removed by the fretting motions, to begin the cycle again.

Many brake systems with a shock absorbing mount between the caliper and actuator assembly require additional brackets and linkages to transmit the braking loads to the truck frame. These systems with their extra linkages and brackets are less compact and more complicated.

Thus, the object of the present invention is to provide a rattle free brake caliper mounting system.

Another object of the present invention is to provide a suspension system to reduce shock loading of the caliper and actuator assembly without the need of extra linkage to transmit the brake loads to the truck frame.

An even further object of the present invention is to provide a brake caliper system which reduces fretting corrosion of the caliper, bridge and bridge pin system.

A still even further object of the present invention is to provide a caliper system capable of fine tuning in the field.

An even further object of the present invention is to provide a brake caliper system which can be retrofitted to existing brake systems.

These and other objects are achieved by providing rigid-non metal bridge washers separating a caliper lever from the bridge, a rigid non-metal bridge bushing separating a shaft of the bridge pin from the bridge and a rigid non-metal lever bushing separating the bridge pin from the lever. This not only reduces the fretting, but provides non-metal to metal contact and reduces the oxidation and corrosion. Preferably, the bridge washer and the bridge bushing are unitary. A nonmetal spring is provided between the bridge pin and the lever to retard vibration of the bridge pin relative to the lever when the brake caliper assembly is not activated. The spring preferably includes a ring between the bridge pin and the lever and the ring is pre-loaded by the bridge pin. The ring is received in a recess of the lever bushing. A plurality of rings are spaced along and received in a respective recess in the lever bushing. The bridge washer, bridge bushing and lever bushing are preferably polymers.

The bridge bushing and lever bushing absorb shock and transmit forces between the bridge pin, bridge and lever during the initial phase of the actuation of the brake caliper assembly. The bridge bushing and the lever bushing are of material individually selected to absorb the anticipated shock during the initial phase of actuation of the brake caliper assembly for a particular system and environment. The characteristics of the spring is individually selected for retarding anticipated vibration of a bridge pin relative to the lever when the brake caliper assembly is not actuated for a particular system and environment. The spring rate of the spring, which includes a ring between the bridge pin and the lever, may be selected or varied by selecting the bridge pin outer diameter and the ring inner diameter for selection of pre-loading of the ring by the bridge pin. Also, the material and the cross section of the ring may be selected to select the appropriate spring rate of the spring.

The method of designing a brake caliper assembly includes determining the anticipated shock forces at each of the bushings during the initial phase of actuation of the brake assembly and then selecting the material to absorb the anticipated shock. Also, the anticipated vibration between the bridge pin and the lever is determined when the brake assembly is not activated and the spring rate of the spring is selected to retard the anticipated vibration.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 2:
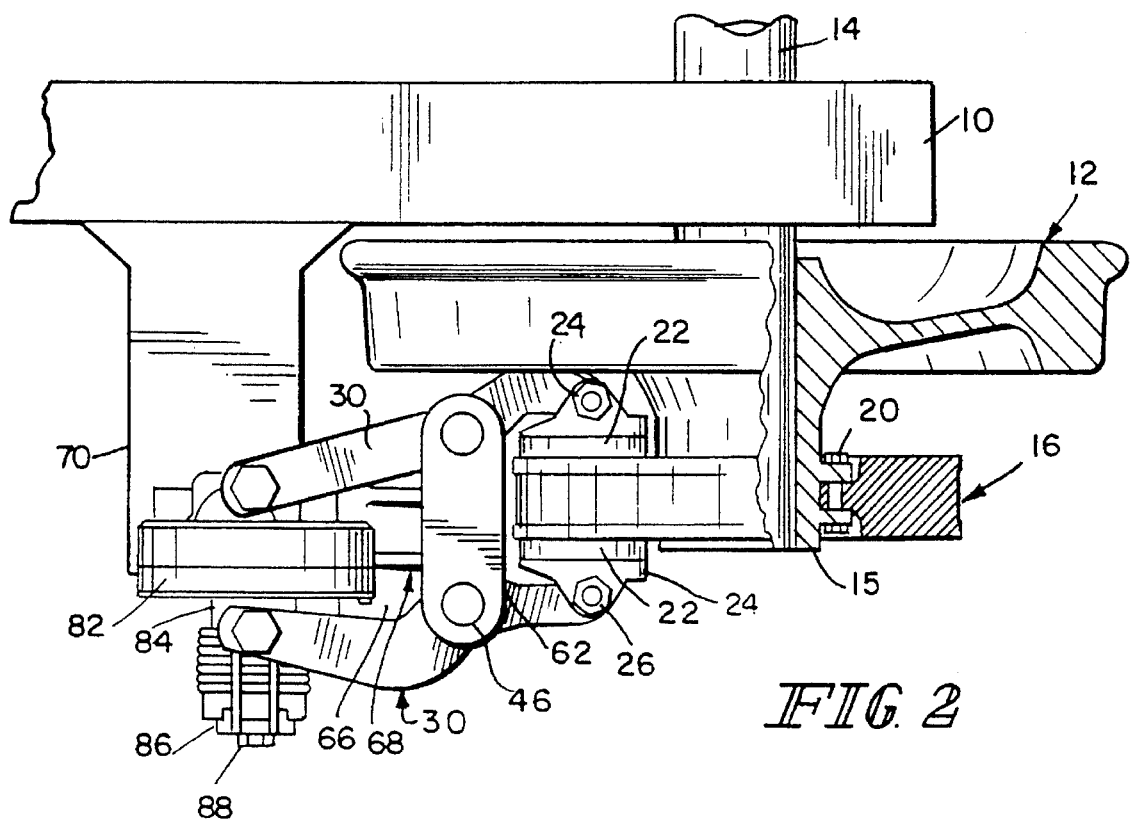
FIG. 2 is a plan view of the disk brake system of FIG. 1.
Figure 1:
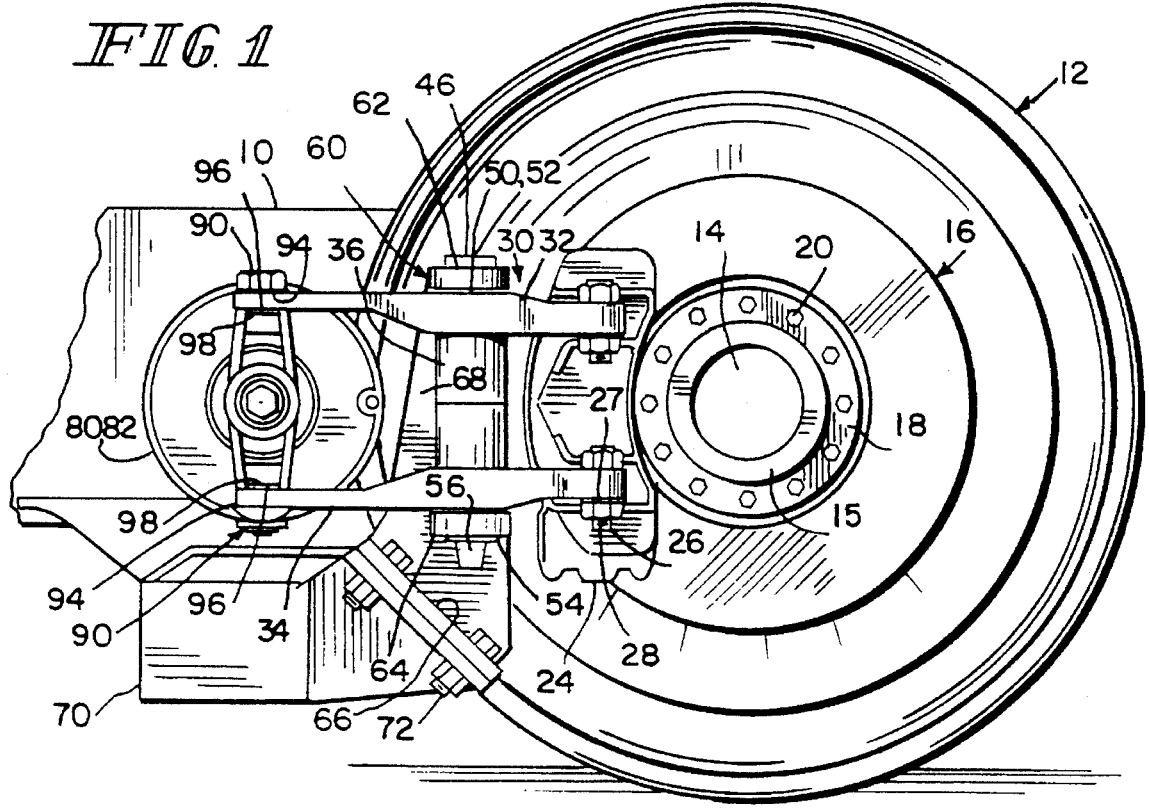
FIG. 1 is a side view of a disk brake system incorporating the principles of the present invention.

A disk brake assembly is illustrated in FIGS. 1 and 2 for a wheel 12 mounted to a truck or bogie frame 10 by an axle 14. Wheel hub 15 is also mounted to the axle 14. Friction disk 16 is mounted between a flange on the wheel hub 15 and tension ring 18 by fasteners 20. Brake lining or pads 22 are positioned on each side of the friction disk 16 and are mounted to a respective pad holder assembly 24. Pad pin 26 mounts the pad holder assembly 24 to upper lever arm 32 and lower lever arm 34 of the pair of caliper levers 30. A washer 27 separates a cotter pin 28 received in the end of the pad pin 26 from the lever arms 32 and 34. The upper lever arm 32 and the lower arm 34 are connected by a center lever shaft 36.

Figure 3:
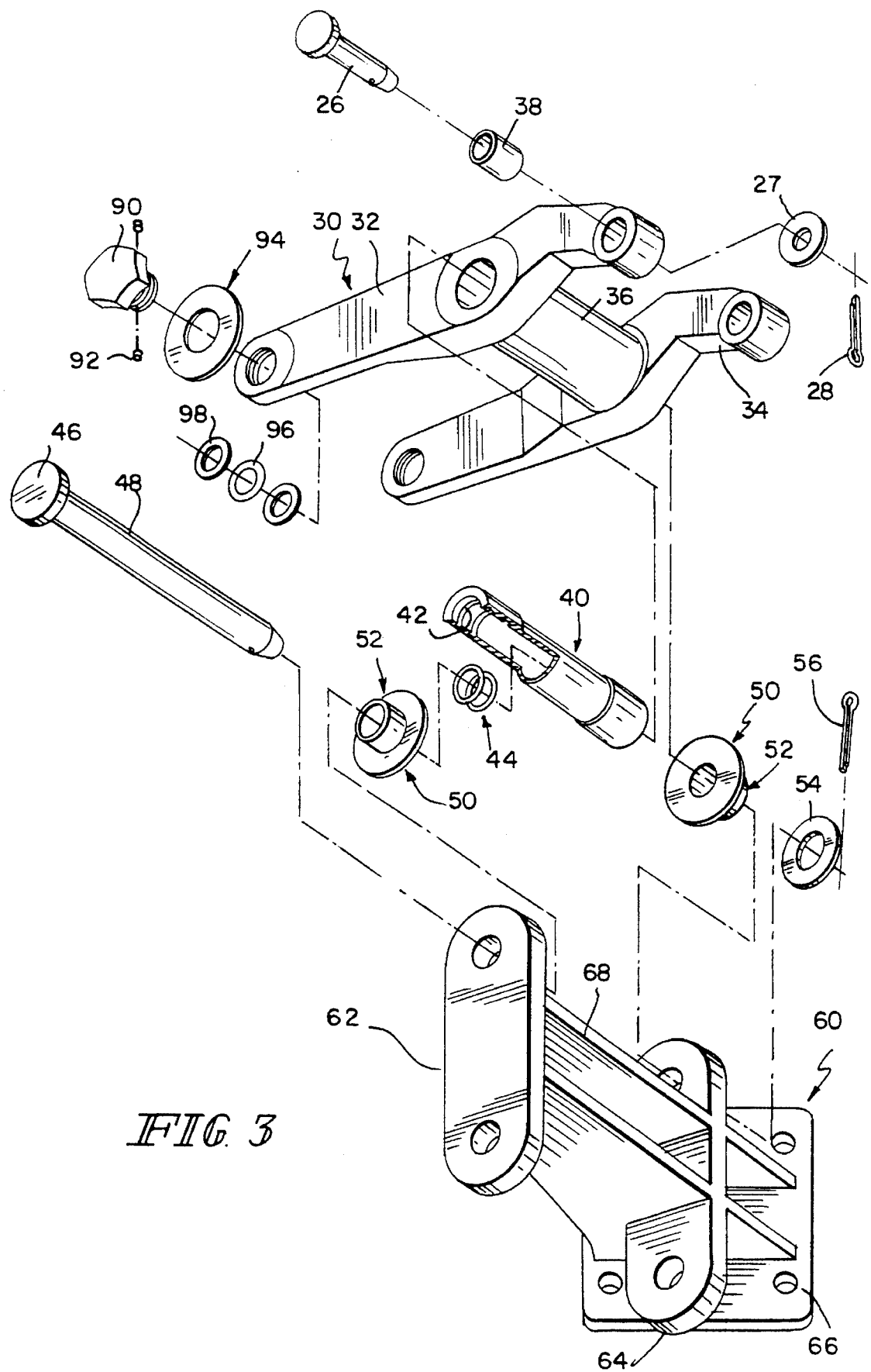
FIG. 3 is an exploded view of the brake caliper system assembly incorporating the principles of the present invention.
Figure 4:
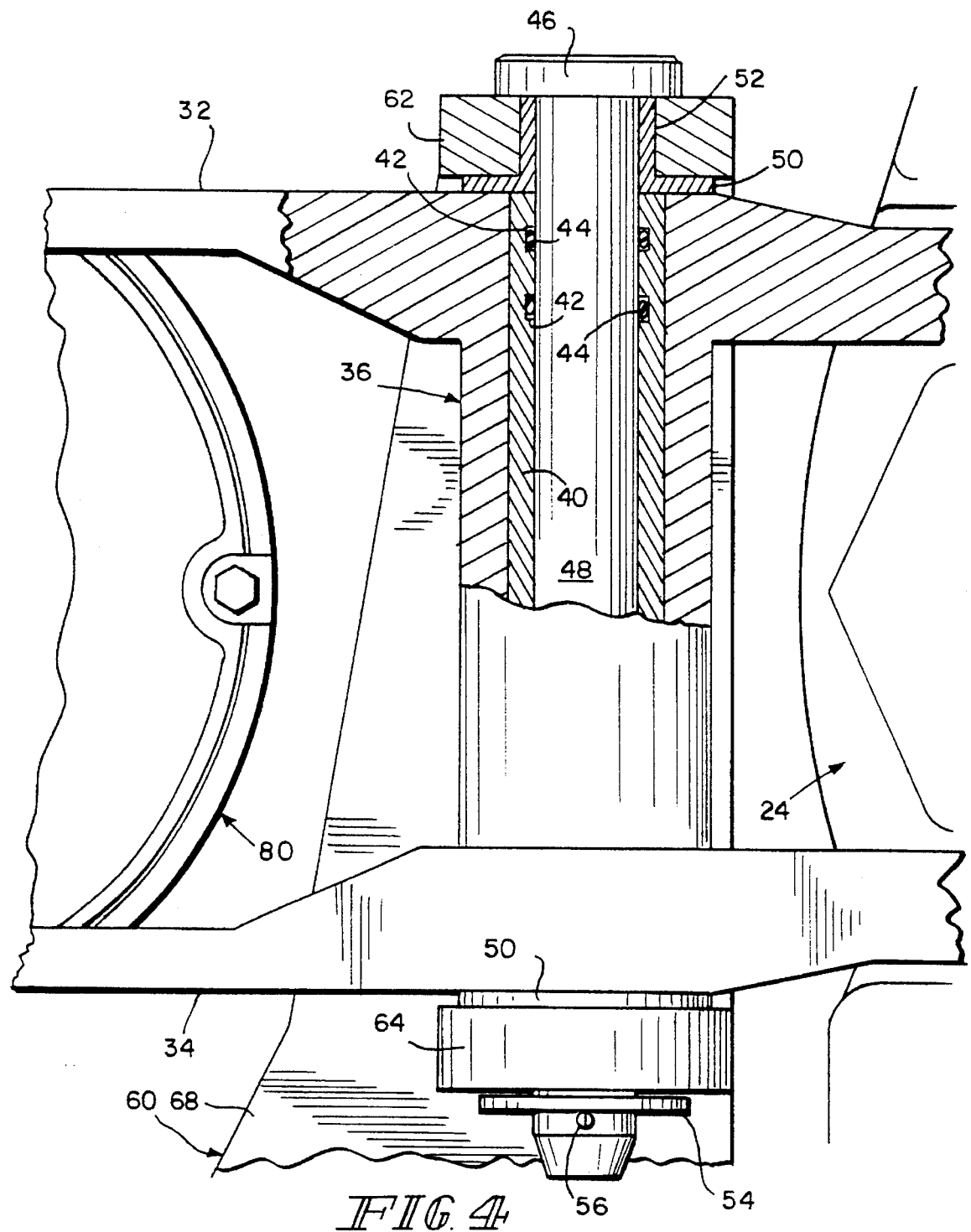
FIG. 4 is an enlarged, partial cutaway view of the brake caliper shock and vibration isolation system of the present invention.

As illustrated in FIG. 3, a pad bushing 38 is provided in the lever arms 32, 34 and separate the pad pin 26 from the lever arms 32 and 34. The shaft 36 of the lever includes a lever bushing 40 as shown in FIG. 4. A plurality of recesses 42 provided in the lever bushing 40 which receives individual rings 44. The purpose of these rings are to be vibration springs and will be described below.

The lever assembly 30 is mounted to a bridge 60 between upper bridge plate 62 and lower bridge plate 64 by bridge pin 46. The lever arms 32, 34 are separated from the bridge plates 62, 64 by washers 50. The shaft 48 of bridge pin 46 is separated from the upper and lower bridge plates 62 and 64 by bridge bushings 52. A cotter pin 56 is received in the end of pin shaft 48 and is separated from the bottom of the lower bridge plate 64 by washer 54. Preferably, the washer 50 and the bridge bushing 52 are made of the same material and are unitary.

Vertical bridge plate 68 interconnects the upper bridge plate 62, lower bridge plate 64 and bridge mounting plate 66. The bridge 60 is mounted to bracket 70 by fasteners 72 through openings in bridge mounting plate 66. The bracket 70 is connected to the truck frame 10 by welding, for example.

An actuator 80 is connected between the pair of caliper levers 30 and forces them apart in opposite directions around the pivoting about the axis of the bridge pin 46 to apply the brakes. The actuator includes a body 82 and a rod 84 extending therefrom. A yoke 86 is provided on the end of the rod 84 and held thereto by fastener 88. The brakes are shown in their unapplied or not activated position in FIG. 2. The body 82 is connected to one of the levers 30 and the yoke 86 is connected to the other lever 30 by actuator bolt 90. The actuator bolt 90 is threadably received in lever arms 32 and 34 and extends into the body 82 or the end of yoke 86. A lock plate 94 locks the bolt after it has been torqued down. The lock plate 94 is bent, as is well known with one side bent to engage the lever arm 32, 34 and the other side is bent up to engage the bolt 90. Between the body 82 or the lever arms 32, 34 and the yoke 86 is a washer 96 and/or a spacer 98 where needed.

The present brake caliper shock and vibration isolation system provides a distinct two stage shock and vibration suspension system: 1) for absorbing shock during the initiation of a brake application, and 2) a spring to reduce the micro motion induced fretting wear promoted by component assembly tolerances when the brakes are not applied.

The washer 50 and bridge bushing 52 are preferably made from a rigid non-metal material. This is a substitution for the previously industry standard metal washer and bushing.

This unitary bridge bushing 52 and washer 50 receive the caliper lever arm's braking forces through the bridge pin 46 and transmits them to the caliper bridge 60. The preferred polymer construction of the bushing provides shock absorption protection from the initial brake application cycle. It also provides fretting corrosion protection by separating the steel caliper and bridge surfaces. The bridge bushing/washer is also used to tune the shock absorption by varying its polymer construction. The preferred polymer is Delrin 100F or 100 AF.

The lever bushing 40 is a non-metal bushing and replaces a metal bushing. The bushing receives the caliper lever's braking forces and transmits them through the bridge pin 46 to the caliper bridge 60. The polymer construction of the lever bushing 40 provides shock absorption protection from the initial brake application cycle. It also provides fretting corrosion protection by separating the steel bridge pin 46 and the levers 30. This lever bushing 40 is also used to tune the shock absorption by varying its polymer construction. The preferred polymer is also Delrin.

The vibration isolation is a spring element including the "O" ring 44. This "O" is in a state of compression once the bridge pin 46 is installed. Its function is to minimize the movement of the caliper lever arms 30 with respect to the caliper bridge 60, while the brakes are not applied. In other words, they take the float and shake out of the system when the brakes are not energized. The spring or O-ring is used to tune the frequency response of the system by changing one or more of its cross section design, material and preload. This element finds no equivalent in prior systems.

The bridge pin 46 performs two functions. One, is to transmit the braking loads from the caliper lever 30 to the bridge 60. The other is to provide a means to easily adjust the preload of O-rings 44. Different diameter pins are installed varying the amount the "O" ring is initially squeezed. In the case of a non-linear spring element, such as an "O" ring, adjusting the preload also varies the initial spring rate of the system. Adjusting the spring rate, adjusts the frequency response (or conversely the transmissibility) of the suspension system. This final system adjustability provides fine tuning capability, to minimize any unwanted vibration transmission discovered in the initial testing phase of a new design.

The brake caliper mounting system just described is rattle free and reduces fretting corrosion wear of the caliper, bridge, and bridge pin system.

It also reduces shock loading of the caliper and actuator assembly without the need for extra linkages to transmit the brake loads to the truck frame. At present, many brake systems, which have suspensions, have a rubber bushing system between the calipers and the truck mounting brackets. Because this type of suspension is so flexible, with three degrees of freedom (rotational, and translational in the vertical and longitudinal directions), the calipers are not able to directly transmit the braking forces from the pads or shoes to the truck frame. An additional truck mounting bracket and linkage system is added to transmit these forces. The present system will obsolete these linkages, making the brake system much more compact, and lightweight.

Much is known in theory, about vibrations and mass/spring/damper systems. However, even the best mathematical modeling will still yield an approximate design which needs field verification and long term evaluation. The present suspension system can be field adjusted, where until now, all others require expensive design and manufacturing changes, taking many weeks to accomplish. The system's isolation characteristics can be adjusted or tuned to minimize the transmission of harmful vibrations from the truck frame. Adjustments are made by substituting different commercially available isolating spring elements, or different diameter bridge pins. Preferably, a buna-n "O" ring is being used and is available in three different harnesses in the same size. Also, it is available in all standard polymers, besides buna-n. The size and configuration of the ring can also be changed. For example, standard "K" rings and square rings could also be used. In other words, the design is very flexible allowing easy combinations of materials, shapes, and pre-loads to be tried in the field to fine tune the suspension for each brake system application.

Finally, the present system could be retrofitted to many existing brake systems, greatly improving the life of the calipers, bridges and bridge pins.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake caliper assembly having at least one lever pivotally connected to a bridge by a bridge pin and further comprising:

a rigid non-metal washer separating said lever from said bridge;

a rigid non-metal bridge bushing separating a shaft of said bridge pin from said bridge; and a rigid non-metal lever bushing separating said bridge pin from said lever.

2. A brake caliper assembly according to claim 1, wherein said washer and bridge bushing are unitary.

3. A brake caliper assembly according to claim 1, including a non-metal spring between said bridge pin and said lever to retard vibration of said bridge pin relative to said lever when said brake caliper assembly is not activated.

4. A brake caliper assembly according to claim 3, wherein said spring includes a ring between said bridge pin and said lever and said ring is pre-loaded by said bridge pin.

5. A brake caliper assembly according to claim 4, wherein said ring is in a recess in said lever bushing.

6. A brake caliper assembly according to claim 1, wherein said washer, said bridge bushing and said lever bushing are polymers.

7. A brake caliper assembly having at least one lever pivotally connected to a bridge by a bridge pin and further comprising:

a bridge bushing separating a shaft of said bridge pin from said bridge for absorbing shock and transmitting forces between said bridge pin and said bridge during an initial phase of activation of said brake caliper assembly;

a lever bushing separating said bridge pin from said lever for absorbing shock and transmitting forces between said bridge pin and said lever during said initial phase of activation of said brake caliper assembly; and a spring between and separating said bridge pin and said lever for retarding vibration of said bridge pin relative to said lever when said brake caliper assembly is not activated.

8. A brake caliper assembly according to claim 7, wherein said bridge bushing and said lever bushing are polymers.

9. A brake caliper assembly according to claim 7, wherein said bridge bushing and said lever bushing are of material individually selected to absorb anticipated shock during said initial phase of activation of said brake caliper assembly for a particular environment.

10. A brake caliper assembly according to claim 7, wherein the spring rate of said spring is individually selected for retarding anticipated vibration of said bridge pin relative to said lever when said brake caliper assembly is not activated for a particular environment.

11. A method of designing a brake caliper assembly having at least one lever pivotally connected to a bridge by a bridge pin; a spring including a ring between and separating said bridge pin and said lever for retarding vibration of said bridge pin relative to said lever when said brake caliper assembly is not activated; comprising the steps of:

providing a lever bushing between said bridge pin and said lever having a recess in said lever bushing for said ring;

determining the anticipated vibration between said bridge pin and said lever when said brake caliper assembly is not activated; and selecting the spring characteristics of said ring to retard said anticipated vibration of said bridge pin relative to said lever when said brake caliper assembly is not activated.

12. A method according to claim 11 wherein said selecting includes selecting said bridge pin outer diameter and said ring inner diameter for a selection of pre-load of said ring by said bridge pin.

13. A method according to claim 12, wherein said selecting includes selecting the material of said ring.

14. A method according to claim 12, wherein said selecting includes selecting the cross-section of said ring.

15. A method according to claim 11, wherein said lever bushing is provided with a plurality of recesses and said spring includes a plurality of rings between said bridge pin and said lever and each of said rings being in one of said recesses.

16. A brake caliper assembly having at least one lever pivotally connected to a bridge by a bridge pin and further comprising:

a bridge bushing separating a shaft of said bridge pin from said bridge for absorbing shock and transmitting forces between said bridge pin and said bridge during an initial phase of activation of said brake caliper assembly;

a lever bushing separating said bridge pin from said lever;

a spring, including a ring in a recess in said lever bushing between said bridge pin and said lever, for retarding vibration of said bridge pin relative to said lever when said brake caliper assembly is not activated; and said ring being pre-loaded by said bridge pin.

17. A brake caliper assembly having at least one lever pivotally connected to a bridge by a bridge pin and further comprising:

a bridge bushing separating a shaft of said bridge pin from said bridge for absorbing shock and transmitting forces between said bridge pin and said bridge during an initial phase of activation of said brake caliper assembly;

a spring including a plurality of spaced rings between and separating said bridge pin and said lever for retarding vibration of said bridge pin relative to said lever when said brake caliper assembly is not activated; and said rings being pre-loaded by said bridge pin.

* * * * *